US006955505B2

(12) United States Patent
Winters et al.

(10) Patent No.: US 6,955,505 B2
(45) Date of Patent: *Oct. 18, 2005

(54) BEACH RESTORATION AND REGENERATION SYSTEMS, METHODS AND COMPOSITIONS

(75) Inventors: William H. Winters, Houston, TX (US); Steve M. Ghormley, Houston, TX (US); Roger D. Oldigs, Houston, TX (US)

(73) Assignee: Novus Systems, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/674,035

(22) Filed: Sep. 29, 2003

(65) Prior Publication Data

US 2004/0057800 A1 Mar. 25, 2004

Related U.S. Application Data

(62) Division of application No. 09/875,404, filed on Jun. 6, 2001, now Pat. No. 6,626,611.
(60) Provisional application No. 60/210,069, filed on Jun. 7, 2000.

(51) Int. Cl.[7] .......................... E02B 3/04; E02D 17/20; E01F 7/00
(52) U.S. Cl. ................. 405/302.6; 405/15; 405/21; 405/29; 405/32; 405/302.7; 256/13

(58) Field of Search .................... 405/15, 21, 22, 405/25, 29, 30, 32, 33, 35, 258.1, 302.6, 302.7; 256/13, 19; 47/9

(56) References Cited

U.S. PATENT DOCUMENTS

| 170,832 A | | 12/1875 | Andrews | |
|---|---|---|---|---|
| 267,523 A | * | 11/1882 | Harris | .................. 256/19 |
| 909,423 A | | 1/1909 | Keller | |

(Continued)

FOREIGN PATENT DOCUMENTS

| JP | 60098017 | * | 6/1985 | .................. 405/16 |
|---|---|---|---|---|
| JP | 10147936 | | 6/1998 | |

OTHER PUBLICATIONS

Inner Space Dredging Services, Inc., Geo Tubes, Website, 1998, Gorham, 1 page, ME & Braintree, MA.
Mirafi, Erosion Control, Website, date unknown, 2 pages, Matagorda, TX.
Duke University, title unknown, website (www.geo.duke.edu/research/psds/tabel1.html), date unknown, 1 page, North Carolina.

*Primary Examiner*—Jong-Suk (James) Lee
(74) *Attorney, Agent, or Firm*—Mark A. Oathout

(57) ABSTRACT

A variety of types of wood matter may be used as a starter material. The starter material is processed into wood pieces in the range of about twenty mesh to six inches to form a base product. The base product is installed in windrows along the beach. A fence may be installed between the windrow(s) and the water.

4 Claims, 5 Drawing Sheets

U.S. PATENT DOCUMENTS

| | | | |
|---|---|---|---|
| 1,146,229 A | | 7/1915 | Adamson |
| 2,071,779 A | | 2/1937 | Willing |
| 3,604,757 A | * | 9/1971 | White .......................... 406/39 |
| 4,329,368 A | | 5/1982 | Springer |
| 4,345,856 A | | 8/1982 | Tuck |
| 4,514,255 A | | 4/1985 | Maxwell et al. |
| 4,635,576 A | * | 1/1987 | Bowers ........................ 405/16 |
| 4,671,495 A | | 6/1987 | Garland et al. |
| 4,710,056 A | | 12/1987 | Parker |
| 5,192,587 A | * | 3/1993 | Rondy ............................. 47/9 |
| 5,265,561 A | * | 11/1993 | Crawford .................... 119/172 |
| 5,338,131 A | | 8/1994 | Bestmann |
| 5,509,755 A | | 4/1996 | Olsen et al. |
| 5,558,460 A | | 9/1996 | Jenkins et al. |
| 5,595,458 A | | 1/1997 | Grabhorn |
| 5,636,939 A | | 6/1997 | Brown |
| 5,641,244 A | | 6/1997 | Bestmann |
| 5,720,573 A | | 2/1998 | Benedict et al. |
| 5,779,782 A | * | 7/1998 | Spittle ............................. 47/9 |
| 5,786,281 A | | 7/1998 | Prunty et al. |
| 5,795,099 A | * | 8/1998 | Parker ...................... 256/12.5 |
| 6,109,835 A | * | 8/2000 | Grabhorn ................ 405/302.6 |
| 6,123,036 A | * | 9/2000 | Decker ......................... 47/56 |
| 6,390,729 B1 | | 5/2002 | Dooley et al. |
| 6,402,426 B1 | | 6/2002 | Dooley et al. |
| 6,523,299 B2 | * | 2/2003 | Morris ............................ 47/9 |
| 6,626,611 B2 | * | 9/2003 | Winters et al. .......... 405/302.6 |

* cited by examiner

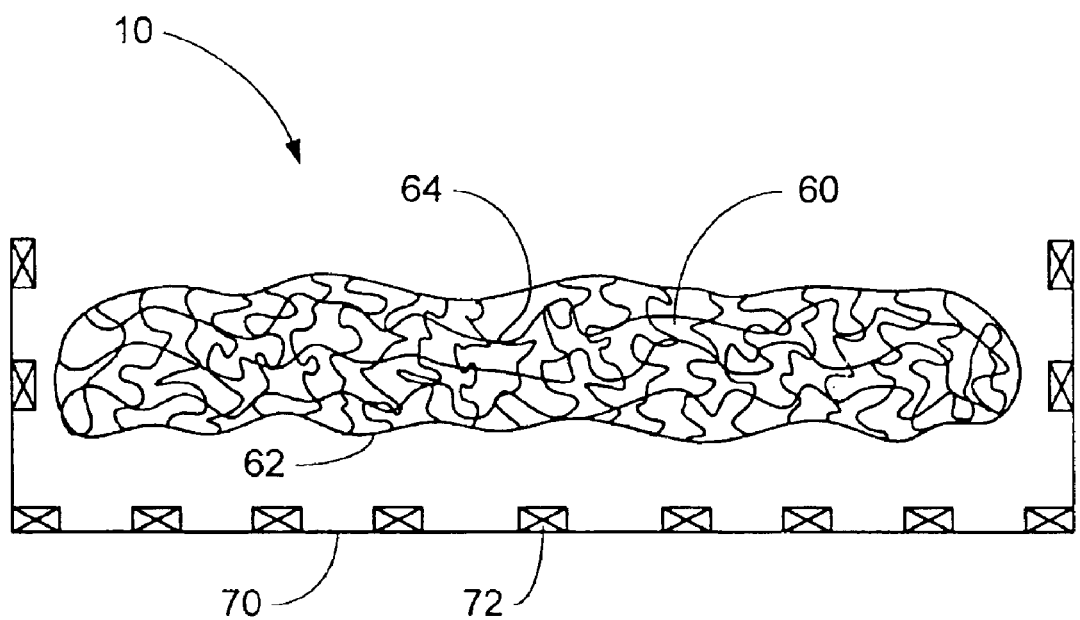
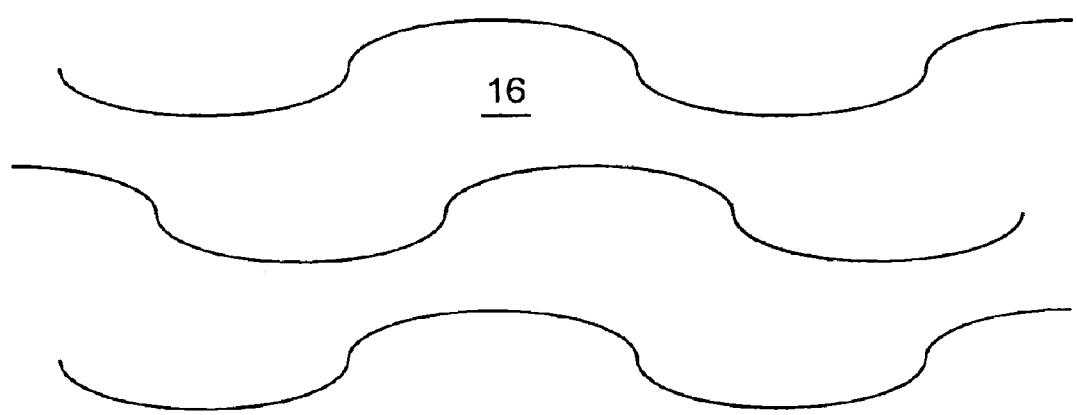
Fig. 3

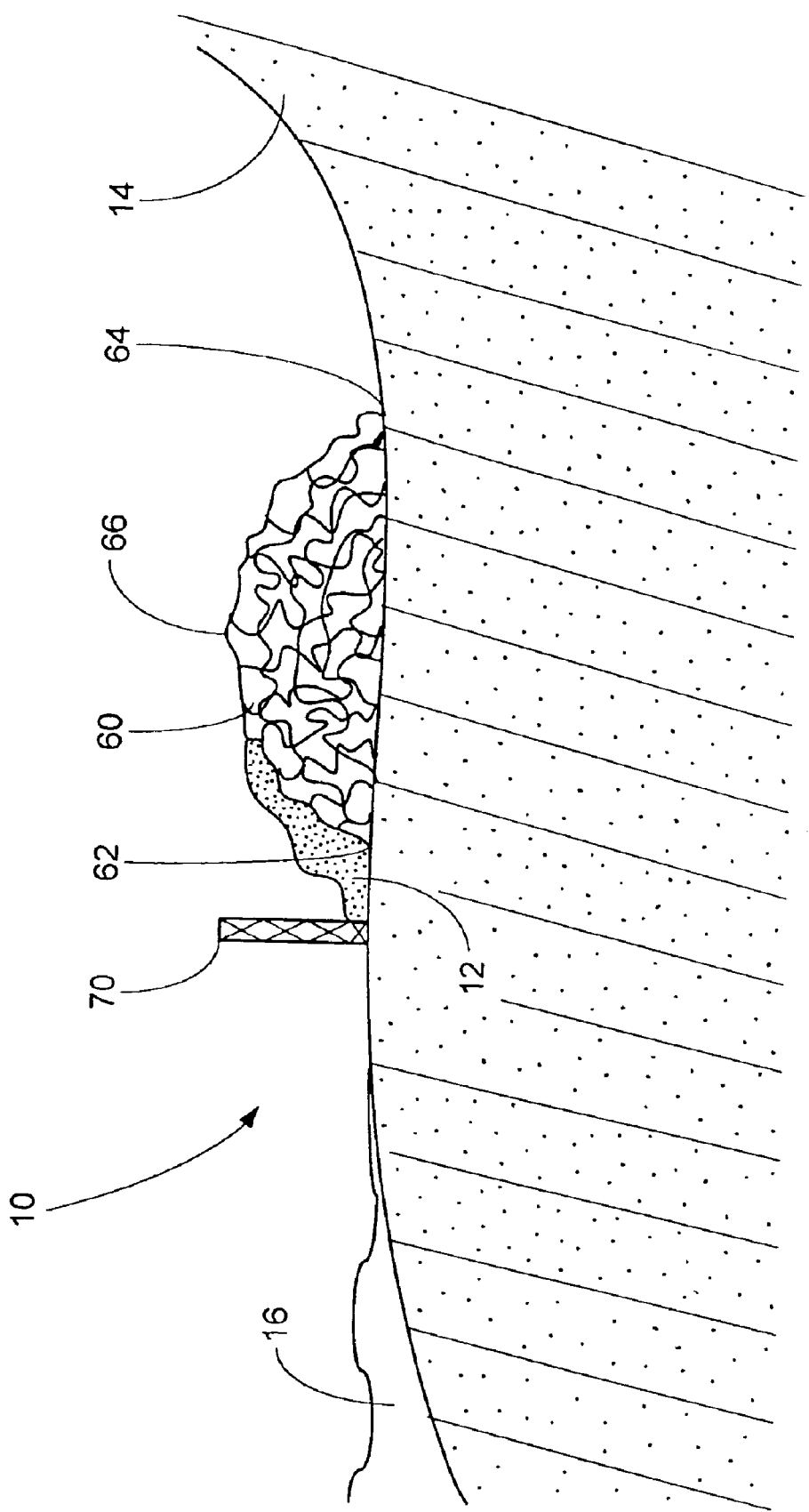

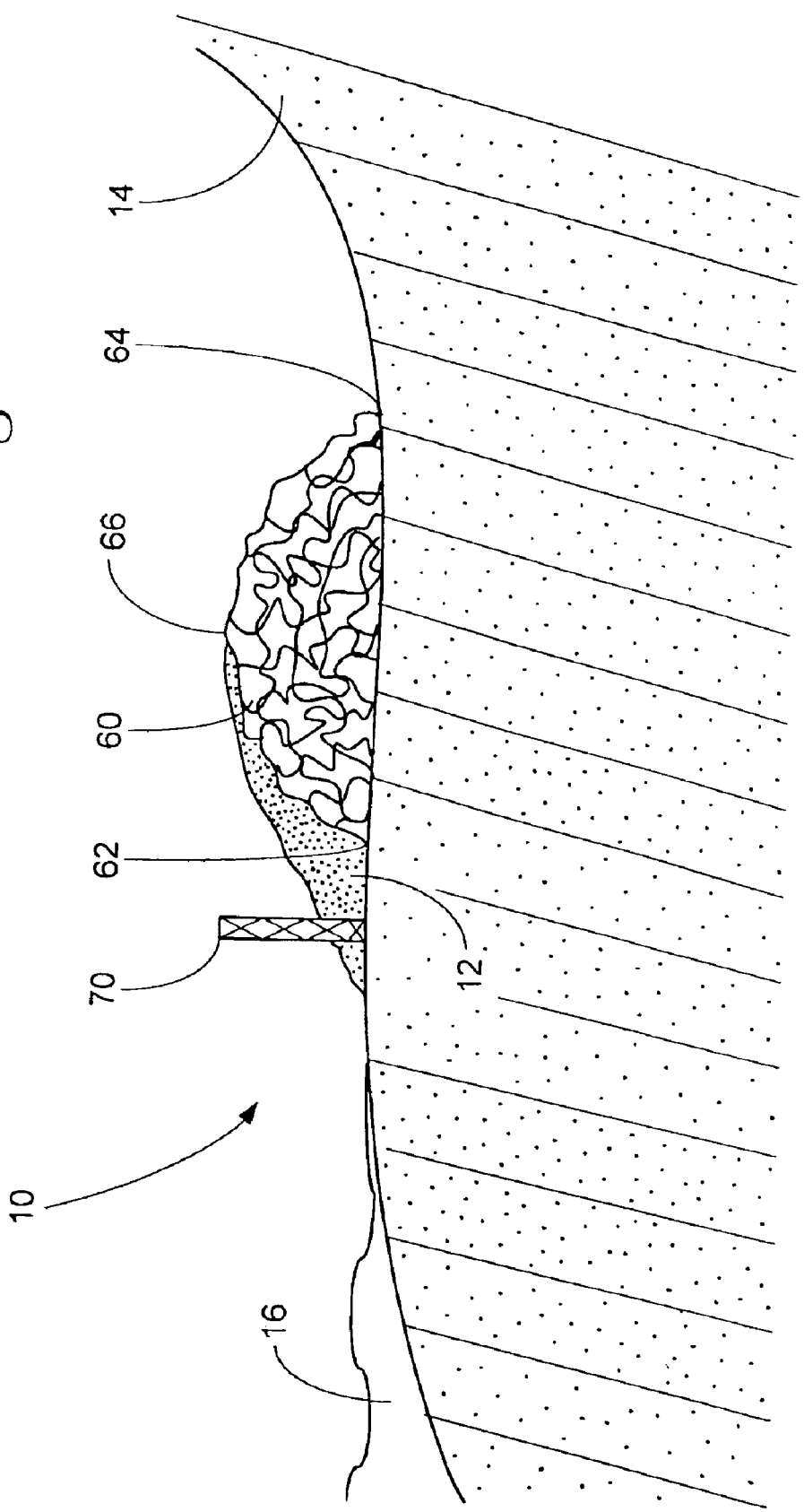

US 6,955,505 B2

BEACH RESTORATION AND REGENERATION SYSTEMS, METHODS AND COMPOSITIONS

CROSS-REFERENCE TO RELATED APPLICATIONS

This application is a divisional of U.S. Utility patent application Ser. No. 09/875,404, filed Jun. 6, 2001 (U.S. Pat. No. 6,626,611) which claims the benefit of U.S. provisional application No. 60/210,069 filed Jun. 7, 2000.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

DESCRIPTION OF THE RELATED ART

The invention relates to a sand dune restoration product and process which is designed to assist Mother Nature in the natural restoration of sand dunes in coastal areas. Coastal erosion is generally caused by natural elements, such as wind and water. Coastal erosion in the form of sand dune destruction is a major problem in many areas. For example, the loss of sand dunes exacerbates the threat to and loss of coastland to the sea, the loss of natural habitats and the loss of valuable public and private land and improvements built thereon. The present invention was developed to help arrest, slow or reverse the natural destruction of sand dunes.

Other attempts to restore beaches in the past include the use of recycled Christmas trees piled on the beaches in an attempt to reduce sand dune erosion. In addition, a product called a "Geotube" is being tested in Galveston, Tex. The product is a composite/plastic tube that is installed parallel to the beach and filled with sand. Heaping sand on top of the Geotube to cover the unit creates an artificial dune.

BRIEF SUMMARY OF THE INVENTION

A variety of types of wood matter may be used as a starter material. The starter material is processed into wood pieces in the range of about twenty mesh to six inches to form a base product. The base product is installed in windrows along the beach. A fence may be installed between the windrow(s) and the water.

BRIEF DESCRIPTION OF THE SEVERAL VIEWS OF THE DRAWINGS

FIG. 3 is a top schematic view of the invention at the time of installation.

FIG. 4 is a view of the invention shown in FIG. 2 after three days.

FIG. 5 is a view of the invention shown in FIG. 2 after seven days.

DETAILED DESCRIPTION OF THE INVENTION

Figure 1:
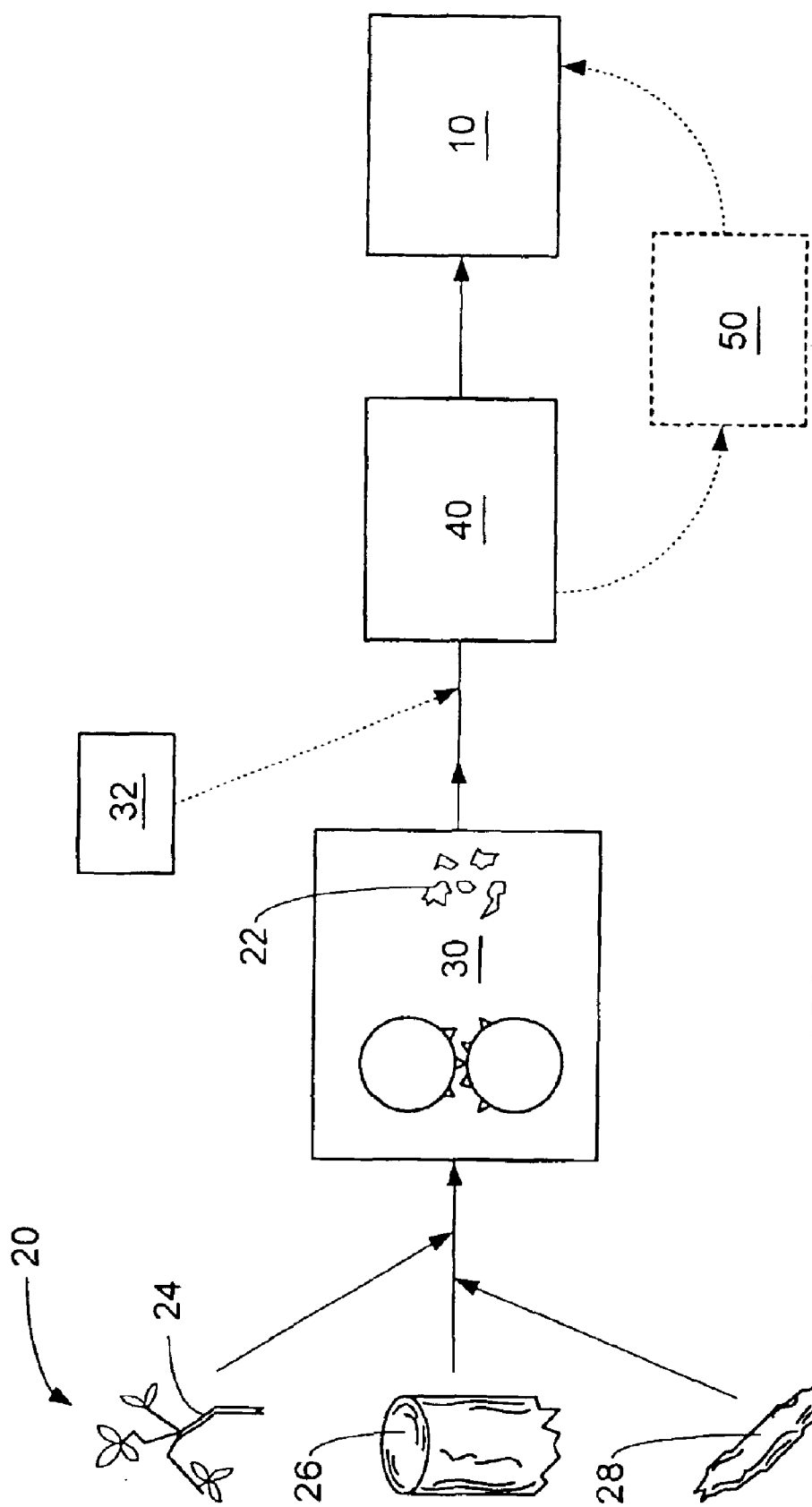
FIG. 1 is a flow diagram of the process used in the beach installation.
Figure 2:
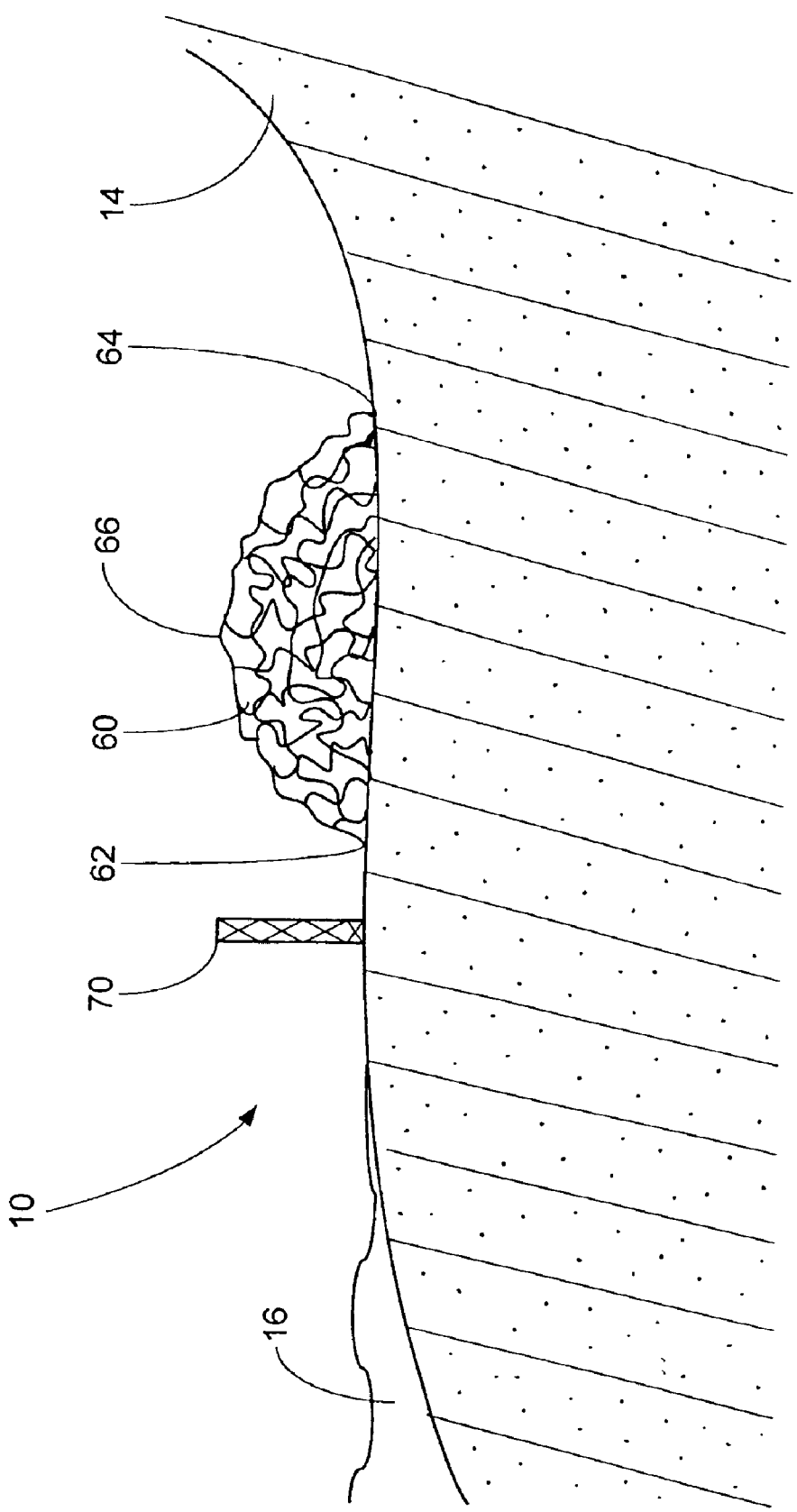
FIG. 2 is an elevational view of the invention at the time of installation.

The starter material 20 used as the base, or foundation to restore and regenerate the beach 10 near water 16 is presently derived from 100% organic matter 32, primarily a variety of wood matter. The starter material 20 is processed so as to maximize its ability (1) to collect sand 12 for the purpose of dune regeneration and growth and (2) to provide or enable an organic bed of material to enhance and support plant growth on and around the dune 14. The starter material 20 is processed into pieces 22 having a size which maximizes the material's ability to in effect "weave itself" (its constituent pieces 22) into an intertwined mat, pile or nest and which is sufficiently stable to support sand 12 and to withstand erosion from wind and rain. The size of the pieces 22 of the processed starter material 20 are large enough to capture wind-blown sand 12 and beach 10 debris but small enough to provide nutrients for beach 10 and dune 14 flora.

The raw materials used in the starter material 20 are 100% recycled tree trimmings 24, stumps 26 and/or other natural wood material 28. Different proportions of each may be used so long as the nesting effect may be achieved. The raw materials are processed through a commercially available horizontal woodgrinding machine 30 (represented schematically). Next, other organic matter 32 (represented schematically) such as finished leaf and grass compost may be blended with the processed starter material 20 in an amount not to exceed about 10% by aggregate weight of the processed starter material 20. The size of the pieces 22 of processed starter material 20 ranges from about twenty mesh (sieve) (0.20 inch) up to about six (6) inches maximum. The individual pieces 22 of the processed starter material 20 take on a wide variety of shapes within these approximate size specifications.

The processed starter material 20 with or without added leaf, grass, etc. which is used for the installation will be referred to as the base product 40 (represented schematically). The base product 40 may be given the opportunity to begin the natural composting and degradation process 50 (represented schematically) prior to delivery and installation at the beach 10 location. The natural composting and degradation process 50 increases the nutrient property of the material and will also improve the ability of the base product 40 to resist the founding of undesirables, such as weeds, at the beach site 10 due to the elevated temperatures resulting from composting. However, the base product 40 should not be fully composted prior to installation, as it will not have the proper size to capture the wind-blown sand 12 and beach 10 debris. If the base product 40 is too fine, it will blow away or could be severely damaged by rain. The size and installation of the base product 40 provides the foundation for the growth and restoration of the dune 14 itself and the organic nature of the base product 40 provides a better growing medium from which beach 10 and dune flora can become established and flourish. The base product 40 is delivered to the beach site 10 in bulk transportation vehicles (not shown) and installed using material handling equipment such as front loader and/or hand labor (but not shown). The base product 40 is preferably installed in a windrow shaped pile 60 although other shapes of piles 60 could be used to achieve the desired effect. The windrow (pile 60) may be installed about fifteen feet, for example, from the nearest existing dune.

In a working example the windrow 60 is 200 feet long, by sixty inches wide from toe 62 to toe 64, by twenty-four to twenty-eight inches high at its peak 66. Before or after the windrow 60 has been installed, a fence 70 made of a material such as a ⅜ths inch aperture geotextile (eighteen inches in height) may be installed nearby, such as, within approximately two feet from the toe 62 of the windrow 60 on the water-side of the windrow. Fence stakes 72 may be placed every five feet, to anchor the geotextile material in place. The purpose of the geotextile material is to minimize the erosion of the windrow 60, the resulting dune 14, and/or vegetation in the event of a tidal encroachment, torrential rain, or the like, and to discourage pedestrian traffic. The fence 70 may also assist or enhance in trapping the wind blown sand 12.

The base product 40 is designed to be an all-natural solution or partial solution to sand 12 dune 14 erosion and destruction caused by storm and unusual tidal events. The base product 40 will enhance coastal areas in the natural regenerative dune restoration process and will protect landowners and municipalities from the damaging effects of hurricanes, tropical storms and unusual tidal surges. Note: The base product is not specifically designed to withstand hurricane forces or significant tidal surges that are responsible for dune destruction and erosion in coastal areas. However, within days following such an event, the base product can be installed to begin the natural dune regeneration process.

A test was recently conducted using the working example above. The most surprising result of the test area is the how quickly the dune began growing and developing. In three days the test area was significantly covered by sand and a dune had grown in width, height and mass. Over an approximate seven week period, it is estimated the working example accumulated from forty to two hundred yards of sand. The product does not appear to be an eyesore for beach participants when first installed and yet after only a short period of time is naturally covered by sand and beach debris (seaweed etc.).

The invention may also be applied in other sand blown regions, such as, for example, environs to be preserved in a desert or in arid agricultural fields where the loss of topsoil to the wind is a problem.

Additional layers of the base product 40 may be applied or piggy backed onto or near an existing windrow 60 after an initial desirable dune is created. Likewise portions of a windrow could be removed if desired such as, for example, to create less uniformity in the resulting dune(s).

In conclusion, therefore, it is seen that the present invention and the embodiments disclosed herein are well adapted to carry out the objectives and obtain the ends set forth. Certain changes can be made in the subject matter without departing from the spirit and the scope of this invention. It is realized that changes are possible within the scope of this invention and it is further intended that each element or step recited is to be understood as referring to all equivalent elements or steps. The description is intended to cover the invention as broadly as legally possible in whatever form it may be utilized.

What is claimed is:

1. A method for restoring a beach, comprising:

accumulating a starter material from at least one natural wood material;

processing the starter material into a plurality of pieces within a targeted size range to make a base product wherein said processing step comprises grinding the starter material into the plurality of pieces having the target size within the range of about 0.2 inch to about six inches;

piling the base product along and on top of the beach in an uncontained state wherein said piling step comprises arranging the base product as a windrow; and collecting a wind blown particulate on the base product.

2. The method according to claim 1, further including composting the starter material prior to said piling step.

3. The method according to claim 1, further including installing an additional layer of the base product after said collecting step.

4. The method according to claim 3, further including removing a portion of the base product after said collecting step.

* * * * *